United States Patent
Burd et al.

(10) Patent No.: US 10,017,254 B2
(45) Date of Patent: Jul. 10, 2018

(54) CRUCIFORM WATER DISTRIBUTION VALVE FOR AIRCRAFT GALLEY PLUMBING SYSTEM

(71) Applicant: B/E Aerospace, Inc., Wellington, FL (US)

(72) Inventors: Peter John Leslie Burd, Carmarthenshire (GB); Nicholas James Wilton Pearce, Seattle, WA (US)

(73) Assignee: B/E Aerospace, Inc., Wellington, FL (US)

( * ) Notice: Subject to any disclaimer, the term of this patent is extended or adjusted under 35 U.S.C. 154(b) by 206 days.

(21) Appl. No.: 15/250,132

(22) Filed: Aug. 29, 2016

(65) Prior Publication Data

US 2017/0050732 A1  Feb. 23, 2017

Related U.S. Application Data

(63) Continuation-in-part of application No. 15/220,219, filed on Jul. 26, 2016.

(Continued)

(51) Int. Cl.
*F16K 11/02* (2006.01)
*B64D 11/04* (2006.01)

(52) U.S. Cl.
CPC ..................... *B64D 11/04* (2013.01)

(58) Field of Classification Search
CPC ........................................... B64D 11/04

(Continued)

(56) References Cited

U.S. PATENT DOCUMENTS

| 998,672 A | * | 7/1911 | Burleigh | F16K 1/165 137/601.05 |
| 2,201,077 A | * | 5/1940 | Browning | F24C 3/103 431/280 |

(Continued)

FOREIGN PATENT DOCUMENTS

| DE | 102007005363 A1 | 8/2008 |
| WO | 2014071416 A1 | 5/2014 |
| WO | 2015004497 A1 | 1/2015 |

OTHER PUBLICATIONS

International Preliminary Report on Patentability dated Mar. 6, 2018 for PCT/US2016/049521.

(Continued)

*Primary Examiner* — Minh Le
(74) *Attorney, Agent, or Firm* — Donna P. Suchy

(57) ABSTRACT

A four-way distribution valve is provided that allows for efficient filling and drainage of a potable water supply and waste system including a potable water distribution manifold and water filter in a commercial aircraft galley. The water distribution valve includes a cruciform manifold having a filter drain port connected to the water filter, two supply manifold ports connected to the potable water distribution manifold, and a drainage discharge port. A rotary closure element within the cruciform manifold actuates in accordance with four selectable filling and discharge modes for the valve to fill and drain potable water in the potable water supply and waste system. As a result, the valve can be used to fill the potable water supply system with potable water before a flight, and to selectively drain potable water from the potable water distribution manifold, the water filter, or both after a flight, all through the same valve.

22 Claims, 11 Drawing Sheets

Related U.S. Application Data

(60) Provisional application No. 62/198,748, filed on Jul. 30, 2015, provisional application No. 62/212,995, filed on Sep. 1, 2015.

(58) Field of Classification Search
USPC .......... 137/596, 596.17, 625, 625.17, 625.46
See application file for complete search history.

(56) References Cited

U.S. PATENT DOCUMENTS

| | | | | |
|---|---|---|---|---|
| 2,335,085 | A * | 11/1943 | Roberts | F16K 11/0833 137/625 |
| 2,979,082 | A * | 4/1961 | Neves | A01G 25/16 137/625.11 |
| 4,479,512 | A * | 10/1984 | Ohrendorf | F16J 15/3404 137/625.17 |
| 5,226,454 | A * | 7/1993 | Cabalfin | F16K 31/045 137/870 |
| 5,769,124 | A * | 6/1998 | Ehrhardt | B64D 11/02 137/625.47 |
| 8,479,771 | B2 * | 7/2013 | Campbell | F16K 11/0853 137/625 |
| 9,004,093 | B2 | 4/2015 | Burd | |
| 9,096,321 | B2 * | 8/2015 | Burd | B64D 11/04 |
| 9,546,472 | B2 * | 1/2017 | Burd | B64D 11/02 |
| 2004/0045613 | A1 * | 3/2004 | Hinojosa, Jr. | F16K 11/0853 137/625.47 |
| 2008/0142099 | A1 * | 6/2008 | Yoshimura | F16K 11/0655 137/625 |
| 2008/0223464 | A1 * | 9/2008 | Merrell | E04H 4/1209 137/625 |
| 2010/0323259 | A1 * | 12/2010 | Sung | H01M 8/04223 429/429 |
| 2013/0269796 | A1 | 10/2013 | Burd | |
| 2013/0312844 | A1 * | 11/2013 | Burd | E03C 1/104 137/217 |
| 2013/0312853 | A1 | 11/2013 | Burd | |
| 2014/0061112 | A1 | 3/2014 | Burd | |
| 2014/0123383 | A1 | 5/2014 | Detjen et al. | |
| 2015/0316156 | A1 * | 11/2015 | Nagahama | F16K 5/0407 137/625.46 |

OTHER PUBLICATIONS

International Search Report for International Application No. PCT/US2016/044589 (4 pgs.) dated Nov. 3, 2016.

* cited by examiner

US 10,017,254 B2

CRUCIFORM WATER DISTRIBUTION VALVE FOR AIRCRAFT GALLEY PLUMBING SYSTEM

CROSS-REFERENCES TO RELATED APPLICATIONS

This application claims priority from U.S. Provisional Patent Application Ser. No. 62/212,995, filed Sep. 1, 2015, and is a continuation-in-part of U.S. patent application Ser. No. 15/220,219, filed Jul. 26, 2016, which claims priority from U.S. Provisional Patent Application Ser. No. 62/198,748, filed Jul. 30, 2015, which are incorporated by reference in their entirety.

BACKGROUND

The present invention generally relates to a flow control valve, and more particularly relates to a water distribution valve for a potable water supply and waste system for aircraft galleys or monuments.

Commercial aircraft flights commonly have aircraft galleys with a potable or drinking water system and a waste water disposal system. Galley inserts such as beverage makers and other water-consuming appliances placed in a work deck of the aircraft galley are usually connected to potable water and waste water disposal systems to provide hot and cold beverage and waste service for commercial aircraft cabin passengers during flight. Flight crew members generally fill the potable water supply system for ready access before the flight begins, and then drain the system when food and beverage service is complete at the end of the flight.

However, multiple or separate manifolds are typically used for both supplying and draining the potable water supply and waste system, taking up the limited space behind the work deck and catering inserts of an aircraft galley. This space in the aircraft galley is required for multiple sources of water consumption, including but not limited to steam ovens, beverage makers, sinks, drip trays, and chillers, so additional usage of that space by extra plumbing components can detrimentally impact the galley's usability. In addition, some galleys may be designed to be more compact, or have a reduced footprint, than conventional commercial aircraft galleys, making a simplified, space-effective solution all the more important. A need therefore exists for a simplified and space-effective potable water supply and waste system for aircraft galleys or monuments in commercial aircraft cabin interiors which allows supplying and draining of the potable water supply and waste system through the same flow control valve.

Hence, it is desirable to provide a water distribution valve for a potable water supply and waste plumbing system in conventional and reduced footprint aircraft galleys installed in commercial aircraft cabin interiors which allow for the filling and drainage of the potable water supply and waste plumbing system through the same valve. The present invention meets this and other needs.

SUMMARY OF THE INVENTION

The present invention provides a flow control or water distribution valve for use in an aircraft galley's potable water supply and waste system which allows for the efficient filling of the system with potable water while also allowing for complete drainage of the system through the same water distribution valve, without cross contamination between the systems. The present invention incorporates a four-way, cruciform water distribution valve that connects in fluid communication with a potable water distribution manifold and a water filter in the aircraft galley's potable water supply and waste system. The water distribution valve of the present invention can be used to fill the potable water distribution manifold with potable water to be supplied to the aircraft galley inserts, and to selectively drain potable water from either the potable water distribution manifold, the water filter, or both to flush the potable water supply and waste system. As a result, the present invention saves additional space for galley catering inserts in conventional and reduced-footprint aircraft galleys or monuments and thereby provides for more efficient galley complexes in commercial aircraft cabin interiors.

Accordingly, a water distribution valve is provided for a potable water supply and waste system of an aircraft galley. The potable water supply and waste system may include a potable water distribution manifold having one or more vent valves, a water filter connected to a water filter drain line, one or more galley insert drain lines, one or more sumps connected to a main drain line, and a compact drain strainer connected to the main drain line. The water distribution valve is connected in fluid communication with the potable water distribution manifold and the water filter and to drain potable water into the sump or main drain line. The water distribution valve can be plastic, metal, or a combination of plastic and metal.

The water distribution valve includes a valve body, a cruciform manifold inside the valve body, and a rotary closure element contained within the cruciform manifold. The cruciform manifold includes a filter drain port, a first supply manifold port, a second supply manifold port, and a discharge drain port. The filter drain port is configured to connect in fluid communication with the water filter, and the first and second supply manifold ports are configured to connect in fluid communication with the potable water distribution manifold. The discharge drain port is configured to drain potable water from the water filter, catering inserts, and the potable water distribution manifold into the one or more sumps or main drain line.

The rotary closure element is configured to move according to a plurality of modes of operation of the valve, including a filling mode, a manifold draining mode, a system draining mode, and a filter draining mode. The rotary closure element is specially structured to accomplish these modes of operation. In particular, the rotary closure element includes a first end and a second end that are arcuate, and the first end has a larger arcuate length than the second end. As a result, the rotary closure element can be rotatably operated to enable filling and draining of the potable water distribution manifold, the water filter, or both through the same valve body using the following four modes of operation:

Filling Mode—in the filling mode, the rotary closure element has been actuated such that the first end of the rotary closure element closes the filter drain port, and the second end of the rotary closure element closes the discharge drain port, or vice-versa. This configuration leaves the first and second supply manifold ports of the cruciform manifold open to enable filling of the potable water supply and waste system with potable water through the valve body.

Manifold Draining Mode—in the manifold draining mode, the rotary closure element has been actuated such that the first end of the rotary closure element closes the filter drain port, but with the second end of the rotary closure element clearing the discharge drain port. This configuration leaves the discharge drain port and the first and second supply manifold ports open to enable drainage of the potable water distribution manifold through the valve body into the sump and main drain line.

System Draining Mode—in the system draining mode, the rotary closure element has been actuated until the first and second ends of the rotary closure element clear all ports in the cruciform manifold, including the filter drain port, the discharge drain port, the first supply manifold port, and the second supply manifold port. This configuration enables drainage of the potable water distribution manifold and the water filter through the valve body into the sump and main drain line.

Filter Draining Mode—in the filter draining mode, the rotary closure element has been actuated such that the first end of the rotary closure element closes the first supply manifold port, and the second end of the rotary closure element closes the second supply manifold port, or vice-versa. This configuration leaves the filter drain port and the discharge drain port open to enable drainage of the water filter through the valve body into the sump and main drain line.

In one aspect of the present invention, one or more resilient seals may be positioned in the valve, and the valve body may include one or more removable covers to enable access to the seals for maintenance or repair. In another aspect, the first supply manifold port and the second supply manifold port are inclined at an angle relative to a horizontal axis of the water distribution valve, for example 5 degrees, to enable drainage of potable water from the potable water distribution manifold. In a further aspect, an actuating lever is connected to the rotary closure element external to the removable cover of the valve body for rotating the rotary closure element between the plurality of modes of operation of the valve. Moreover, a stepper motor may be operatively connected to the water distribution valve via the actuating lever and configured to move the rotary closure element between the plurality of modes of operation of the valve by electrical operation. Alternatively, the valve may be manually operable by conventional tools, or by an actuating shaft connected to an actuating knob on a galley panel in lieu of conventional tools, in the event of failure of the stepper motor and in the event of failure in a power supply powering the stepper motor.

In a preferred aspect of the present invention, the water distribution valve is interlinked with a main water shut off valve in the potable water supply and waste system. In particular, the valves are interlinked such that when the water distribution valve is in the filing mode, the main water shut off valve is open and allows potable water to flow to the potable water distribution manifold, but when the water distribution valve is in the manifold draining mode, the system draining mode, or the filter draining mode, the main water shut off valve is closed to block potable water from flowing to the potable water distribution manifold. As a result, continuous discharge or drainage of potable water in the potable water supply and waste system is prevented.

These and other features and advantages of the present invention will become apparent from the following detailed description of preferred embodiments which, taken in conjunction with the accompanying drawings, illustrate by way of example the principles of the invention.

DETAILED DESCRIPTION OF THE PREFERRED EMBODIMENTS

A preferred embodiment of the present invention provides for a water distribution valve for implementation in a potable water supply and waste system for a commercial aircraft galley that allows for the complete filling and drainage of the potable water supply and waste system through the same valve body. Particularly, the water distribution valve includes multiple ports that are in fluid communication with a potable water distribution manifold and a water filter in the potable water supply and waste system, and a rotary closure element that controls the flow of potable water through the valve according to a plurality of modes of operation. In this way, the water distribution valve allows for selective filling and drainage of the system through the same valve, thus saving much needed space in the aircraft galley.

Additionally, where a faucet for use by crew members in the galley is connected to the potable and waste water system, the water distribution valve prevents backflow of hot water from water-consuming galley inserts into the faucet, thereby reducing the risk of potential injury to crew members from unexpected discharge of hot water. The present invention can also be used to flush the potable water and waste water system as a start-up sequence prior to commencing in-flight service operations. Additionally, the present invention can be linked to other water supply and/or discharge valves, such as a main water shut off valve, for example, to provide sequenced or synchronized operation, or to act as a failsafe in the event that the main water shut off valve fails, thereby preventing continuous discharge of the aircraft water supply.

Figure 1:
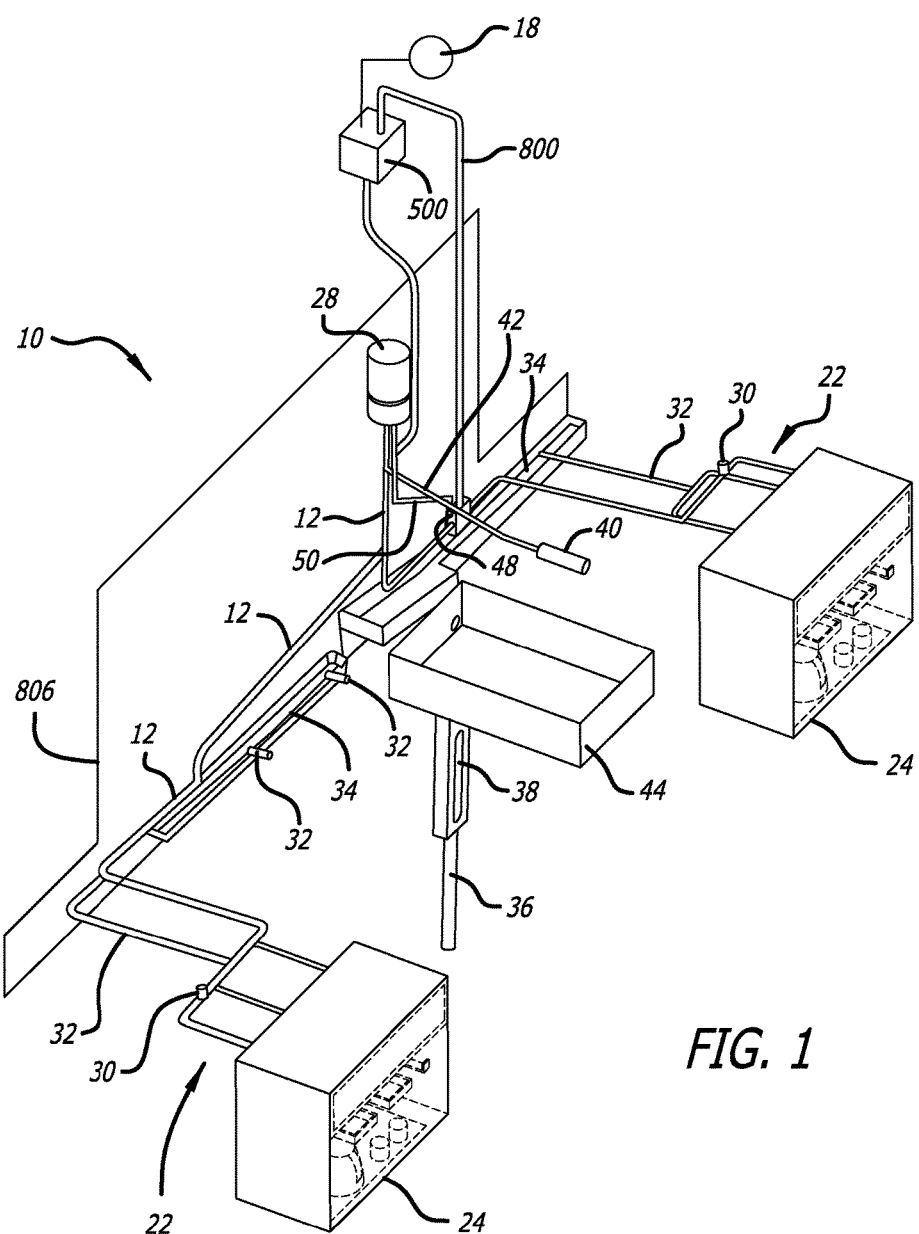
FIG. 1 is a perspective view of a potable water supply and waste system for an aircraft galley including a water distribution valve according to a preferred embodiment of the present invention for controlling the flow of potable water through the potable water supply and waste system, and a main water shut off valve for preventing the flow of potable water to the aircraft galley.
Figure 2A:
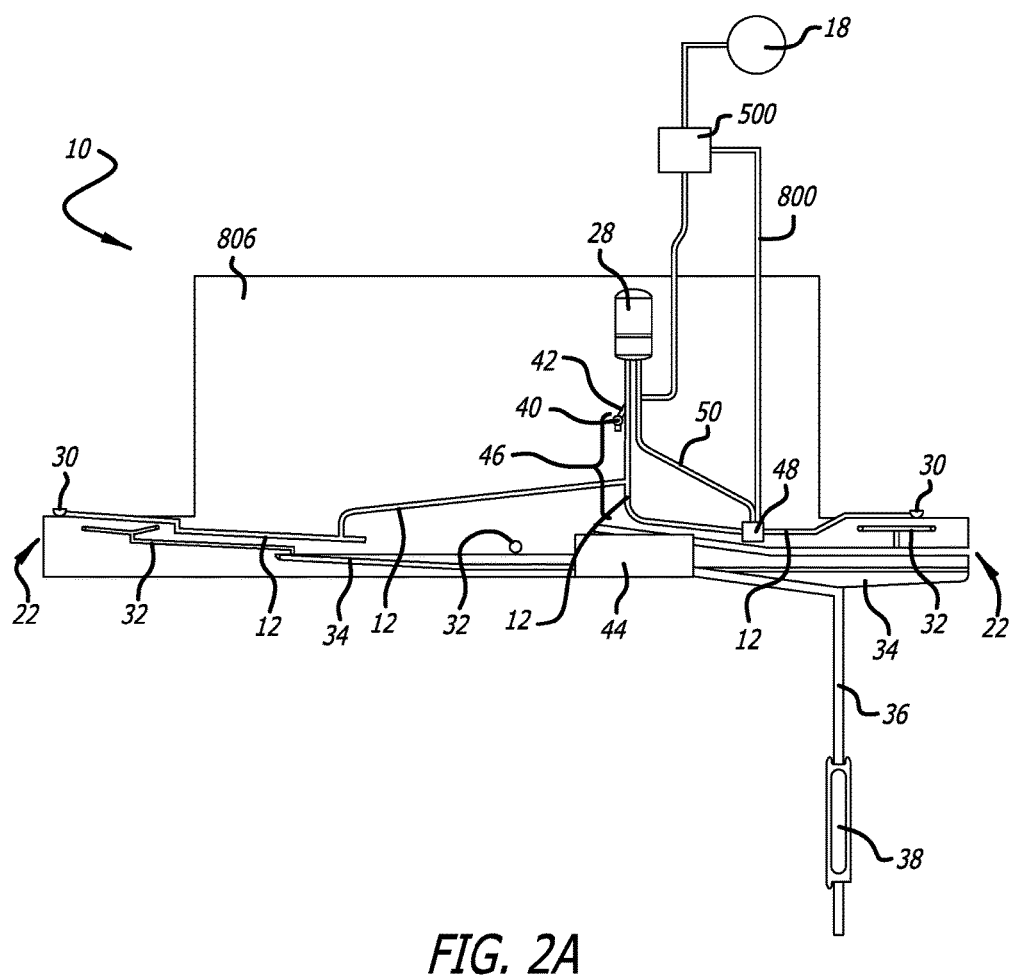
FIG. 2A is a front elevational view of the potable water supply and waste system including the water distribution valve of FIG. 1.
Figure 17:
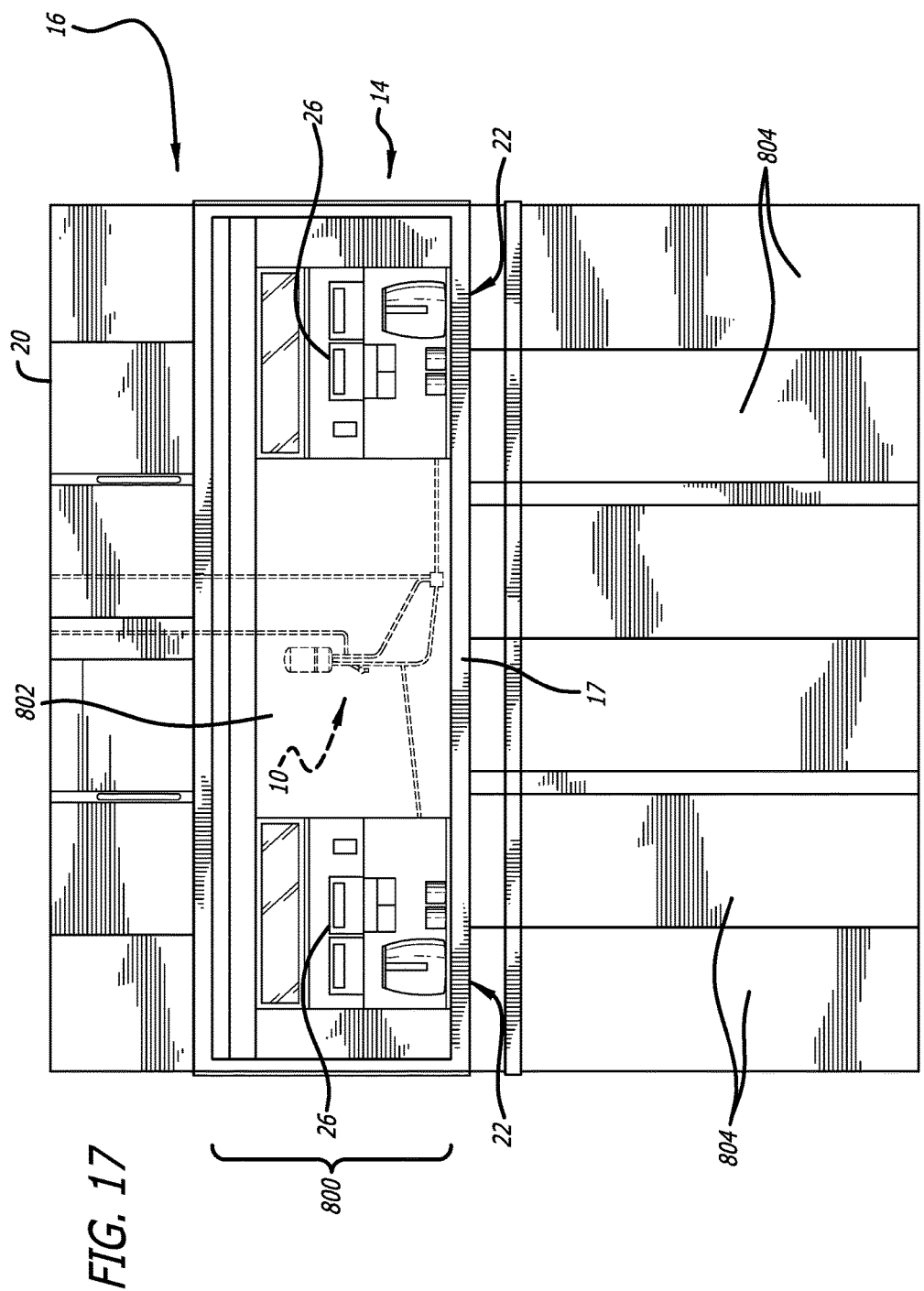
FIG. 17 is a front side elevational view of an aircraft galley in which the potable water supply and waste system of FIG. 1 may be installed.

Referring to the Figures, FIGS. 1 and 2A illustrate a preferred embodiment of a potable water supply and waste system 10 for an aircraft galley. The potable water supply and waste system 10 includes a potable water distribution manifold 12 for both supplying potable water to, and draining potable water from, water consumption sources in a work deck 14 of an aircraft galley 16 (see FIG. 17). As used herein, the term "work deck" includes the working surface or working platform 17 of an aircraft galley as well as the area 800 immediately adjacent to the working surface as shown in FIG. 17.

Figure 18:
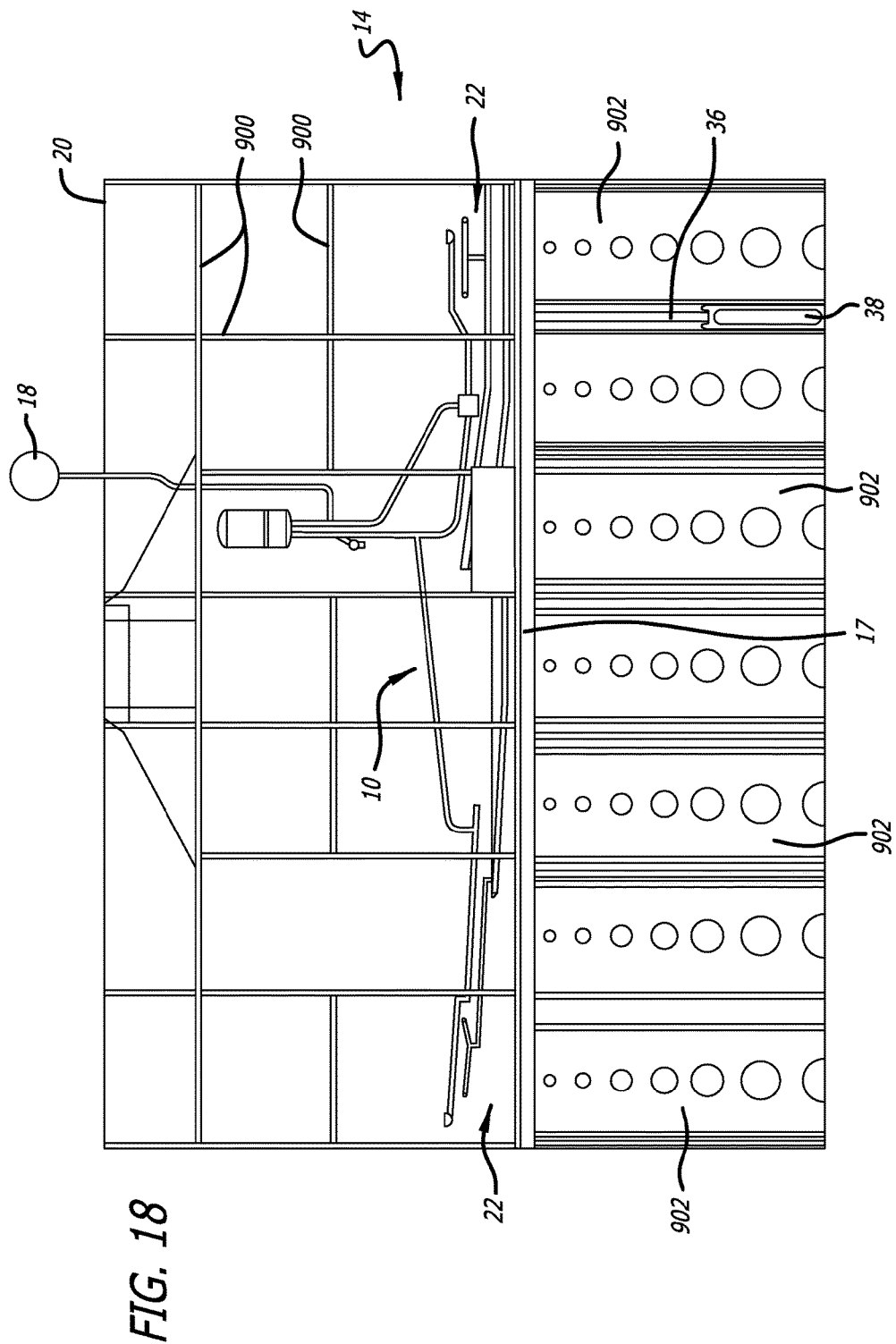
FIG. 18 is a front side elevational view of the aircraft galley of FIG. 17, in which the front of the aircraft galley has been broken away to illustrate placement of the improved potable water supply and waste system as installed.

The potable water distribution manifold is in fluid communication with a potable water source 18. The potable water source provides potable water to the aircraft including the aircraft galley and is generally located in a remote location from the potable water distribution manifold. Such a remote location may be, for example, above the work deck, above the ceiling 20 of the galley as shown in FIG. 18, in another area of the commercial aircraft cabin, or in other suitable locations. The potable water distribution manifold connects to one or more remote areas 22 of the work deck or galley, at which a galley insert 24 such as the beverage maker 26 depicted in FIG. 17 can be placed and connected to the potable water distribution manifold. Galley inserts may include beverage makers or other water-consuming appliances, drip trays, chillers, and the like. As a result, the potable water distribution manifold distributes water from the potable water source to the galley inserts.

A water filter 28 is connected to the potable water distribution manifold 12 and the potable water source 18. The water filter filters the potable water received from the potable water source before it is distributed through the potable water distribution manifold to the galley inserts 24. Moreover, the water filter is preferably self-venting and the potable water distribution manifold preferably includes one or more vent valves 30 to ensure that the potable water source completely fills the potable water supply and waste system 10 when supplying water to the aircraft galley 16.

Provided at each remote area 22 are one or more galley insert drain lines 32 or remote area drain lines. The galley insert drain lines are connected to the galley inserts 24 and receive waste water or consumed water from the galley inserts. One or more sumps 34 are positioned near the galley insert drain lines to receive the waste water flowing through the galley insert drain lines from the galley inserts. The sumps are connected to a main drain line 36 that is preferably positioned below the work deck 14. The sumps allow the waste water from the galley inserts to drain through the galley insert drain lines, into the sumps, and down the main drain line. According to a preferred aspect, the sumps are fitted with a filter (not shown), for example a recessed mesh screen, to prevent blockage of the main drain line by solid waste. According to another preferred aspect, the main drain line is connected in fluid communication with a compact drain strainer 38 located below the work deck. The compact drain strainer is preferably used to filter the drained waste water and preferably includes a backflow preventer (not shown) that prevents back flow of the waste water up the main drain line.

Additionally, a faucet 40 is connected in fluid communication with the potable water distribution manifold 12 via a dedicated faucet supply line 42. The faucet is preferably self-venting to ensure complete filling of the potable water supply and waste system 10. A sink 44 connected to the main drain line 36 receives potable water from the faucet and drains the resulting waste water into the main drain line.

Generally, hot water may occasionally backflow into the potable water distribution manifold 12. For example, hot water from beverage makers 26 or from other galley inserts 24 located at the remote areas 22 may backflow into the potable water distribution manifold. To prevent this backflow of hot water from reaching the faucet 40 and potentially causing injury to a crew member, a backflow preventer 46 such as a back flow prevention loop is preferably incorporated.

Figure 2B:
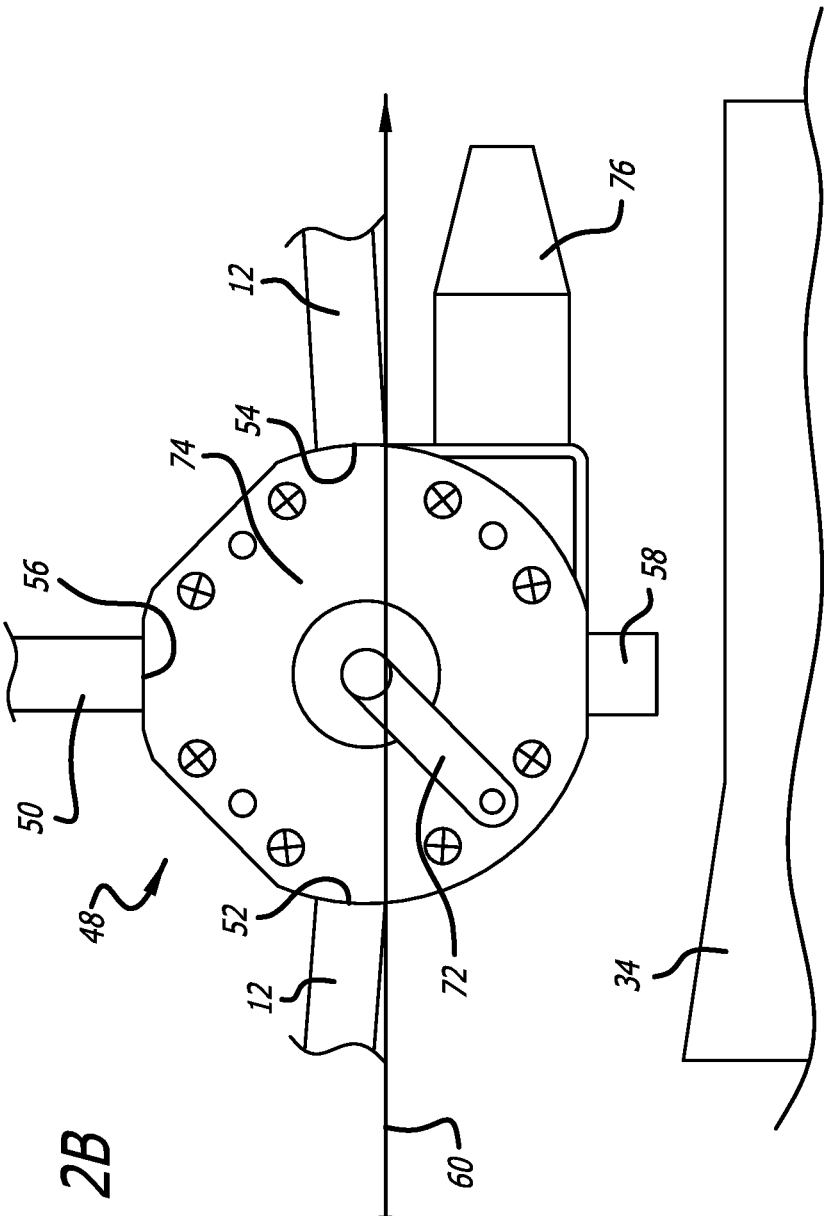
FIG. 2B is an enlarged view of the water distribution valve as installed in the potable water supply and waste system.
Figure 5:
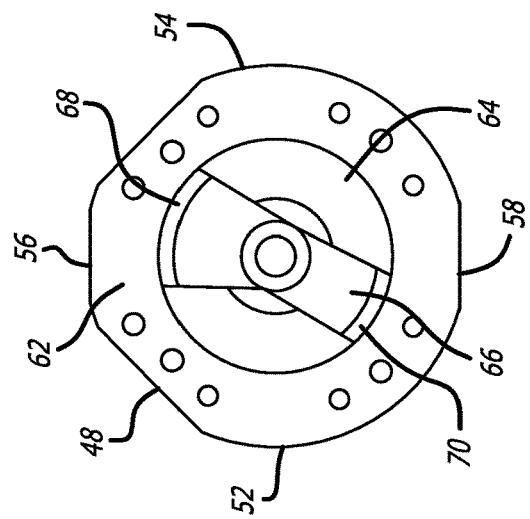
FIG. 5 is a front elevational view of the water distribution valve of FIG. 3 with the front cover and actuating lever removed to illustrate a rotary closure element contained within the valve.
Figure 4:
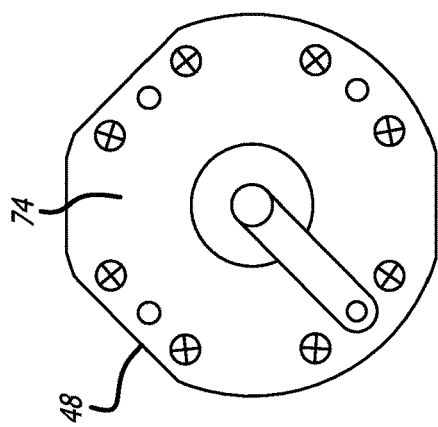
FIG. 4 is a rear elevational view of the water distribution valve of FIG. 3.
Figure 3:
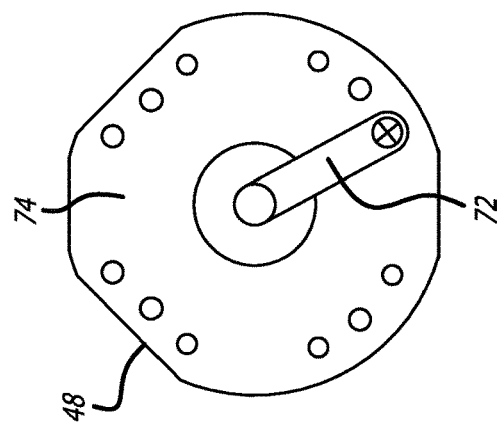
FIG. 3 is a front elevational view of the water distribution valve having a removable front cover and an actuating lever according to a preferred embodiment of the present invention.

Referring now to FIG. 2B, according to a preferred embodiment of the present invention, the potable water supply and waste system 10 includes a rotary, 4-way water distribution valve or cruciform valve 48 that is connected in fluid communication with the potable water distribution manifold 12, and with the water filter 28 through a water filter drain line 50. The water distribution valve 48 is connected in fluid communication with the potable water distribution manifold via a first supply manifold port 52 and a second supply manifold port 54, and the water distribution valve is connected in fluid communication with the water filter through the water filter drain line via a filter drain port 56. The water distribution valve is used to selectively control the flow of potable water in the potable water supply and waste system. For example, before food and beverage service begins on a flight, the water distribution valve may be rotatably operated to allow the potable water source to supply potable water to galley inserts in the work deck, and when food and beverage service is completed at the end of the flight, the water distribution valve may be rotatably operated to allow the excess potable water in the potable water supply and waste system to drain. In this regard, the water distribution valve is intentionally designed to leave open a dedicated drain opening or discharge drain port 58 preferably facing the one or more sumps 34 into which the unused potable water may drain, thereby allowing flight crew members to flush the potable water supply and waste system prior to the next flight.

Figure 11:
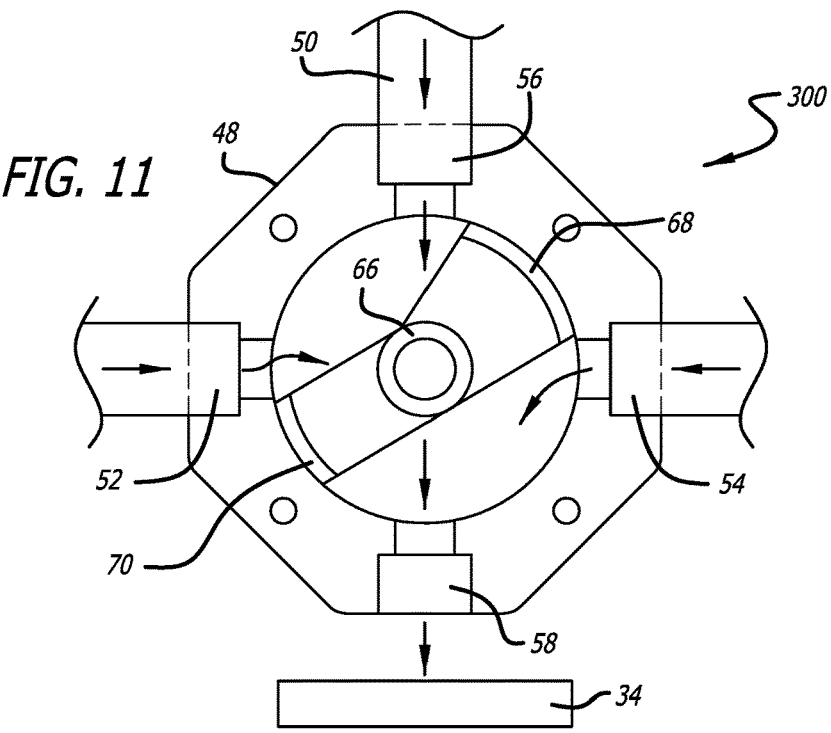
FIG. 11 is a schematic view of the water distribution valve operating in a system draining mode.
Figure 12:
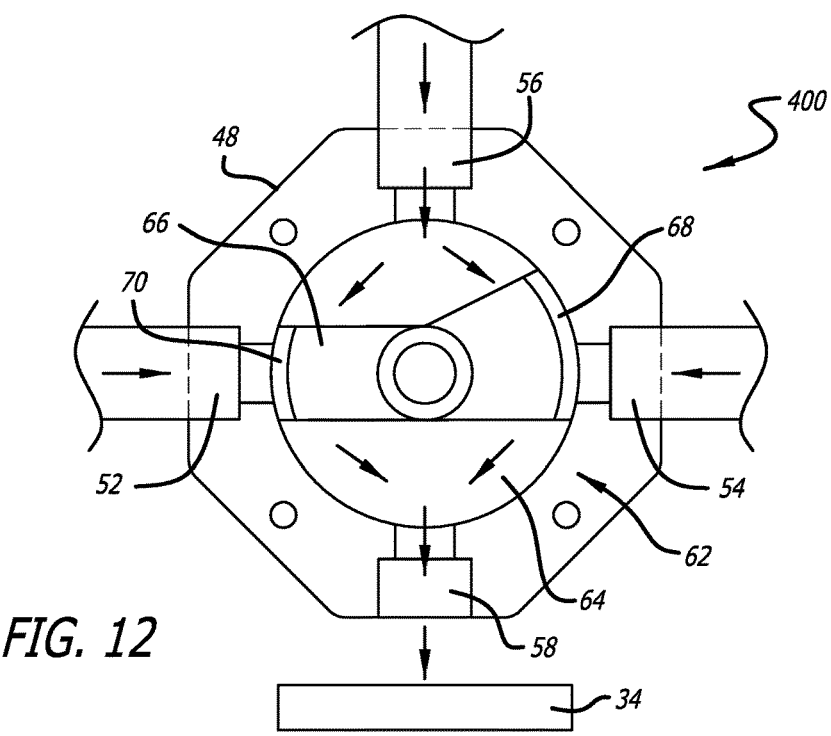
FIG. 12 is a schematic view of the water distribution valve operating in a filter draining mode.

Preferably, the water distribution valve 48 selectively operates between a plurality of modes of operation, including a supplying state or filling mode 100 (see FIG. 9), and a variety of draining states including a manifold draining mode 200 (see FIG. 10), a system draining mode 300 (see FIG. 11), or a filter draining mode 400 (see FIG. 12). The water distribution valve may operate in its supplying state, for example, during the operation of the aircraft galley 16 during flight. Moreover, the water distribution valve may operate in any of its draining states, for instance, when food service is complete at the end of a flight, or when the potable water distribution manifold 12 and/or water filter 28 needs to be drained.

When the water distribution valve 48 is in filling mode 100, the valve allows potable water in the potable water distribution manifold 12 to flow through the valve and to the galley inserts 24 at the one or more remote areas. While in filling mode, the water distribution valve also prevents potable water in the water filter drain line 50 from draining through the valve, thereby forcing the potable water to flow through the water filter 28 and into the potable water distribution manifold. When the water distribution valve is switched to manifold draining mode 200, filter draining mode 400, or system draining mode 300, the valve allows the potable water remaining in the potable water distribution manifold, the water filter, or the entire potable water supply system, respectively, to drain out of the discharge drain port 58 into the one or more sumps 34 and ultimately down the main drain line 36, thereby flushing the system 10.

In a preferred embodiment of the present invention, the first supply manifold port 52 and second supply manifold port 54 of the water distribution valve 48 are inclined relative to a horizontal axis 60 at an angle required for draining the potable water supply and waste system 10. For example, the angle of inclination relative to the horizontal axis 60 can be 5 degrees, adhering to prescribed aircraft requirements.

FIGS. 3-6 illustrate the four-way or cruciform water distribution valve 48 for selectively filling and draining the potable water supply and waste system 10 according to a preferred embodiment of the present invention. The water distribution valve has a valve body 62, inside of which is contained a four-way or cruciform manifold 64. The cruciform manifold includes four valve ports, including the filter drain port 56 used for draining the water filter 28 in the potable water supply and waste system, the first supply manifold port 52 and the second supply manifold port 54 used for filling and draining the potable water distribution manifold 12 in the potable water supply and waste system, and the discharge drain port 58 used for draining both the water filter and the potable water distribution manifold, as will be explained further below. The valve may be made of Federal Drug Administration (FDA)-approved plastic or metal, or a combination of plastic and metal, for example.

A rotor or rotary closure element 66 having a first end 68 and a second end 70 is contained in the valve body 62 within the cruciform manifold 64 for controlling the flow of potable water and waste water through the water distribution valve 48. The rotary closure element is connected to an actuating lever 72 that is positioned external to the valve. The actuating lever is connected to the rotary closure element such that movement of the actuating lever results in rotational movement of the rotary closure element within the valve body. Alternatively, as described more in detail with respect to FIGS. 13 and 14 below, the rotary closure element may be actuated directly by a rod or shaft connecting to a rotary knob in parallel with the valve body, but located some distance from the valve on the working face of the galley and within easy reach of the flight attendants.

In a preferred embodiment, the water distribution valve 48 includes one or more covers 74 that enclose the rotary closure element within the valve body. The covers 74 are intended to be removable in order to allow servicing of the water distribution valve. In one preferred aspect, the water-distribution valve also incorporates one or more resilient seals (not shown) to prevent leakage of water flowing through the valve. Seals may be made from polytetrafluoroethylene (PTFE), Viton™ fluoroelastomers, or other conventional resilient materials. The seals may be placed on the rotary closure element 66, inside valve ports (52, 54, 56, 58), on the removable valve body covers 74, or on any combination of the above. As a result, the covers 74 can also be removed for seal maintenance and repair.

Figure 8:
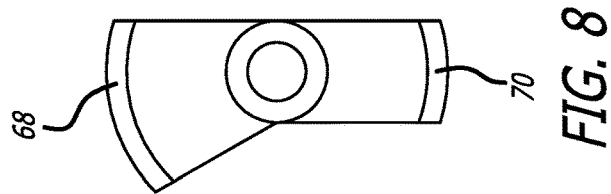
FIG. 8 is a front elevational view of the rotary closure element.
Figure 7:
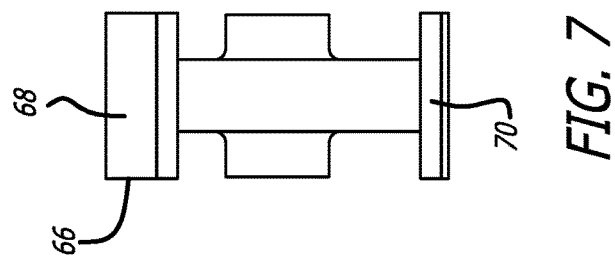
FIG. 7 is a side elevational view of the rotary closure element contained within the water distribution valve.
Figure 6:
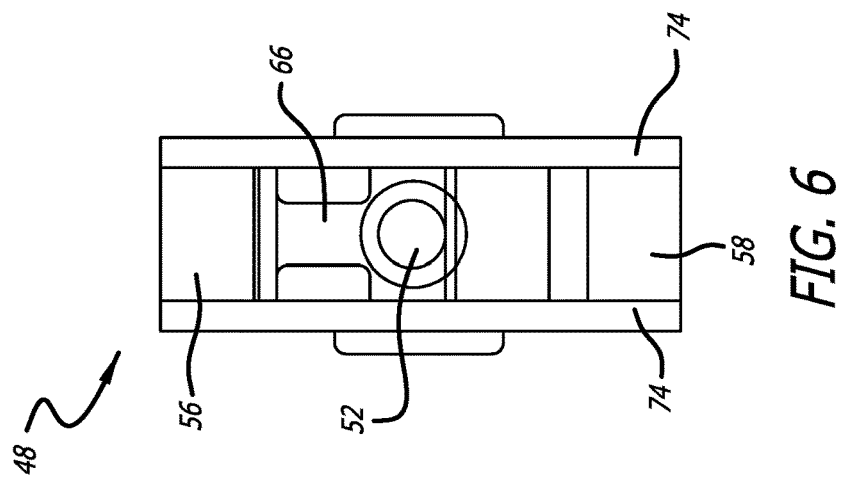
FIG. 6 is a side elevational view of the water distribution valve with rotary closure element.

With reference to FIGS. 7 and 8, in the preferred embodiment of the water distribution valve 48, the first end 68 and second end 70 of the rotary closure element 66 are arcuate, and the first end 68 has a larger arcuate length than the second end 70. This specially designed sizing and shape of the rotary closure element allows for it to control the flow of water through the water distribution valve, in response to movement of the actuating lever 72, in accordance with the valve's multiple modes of operation as depicted in FIGS. 9-12.

Figure 9:
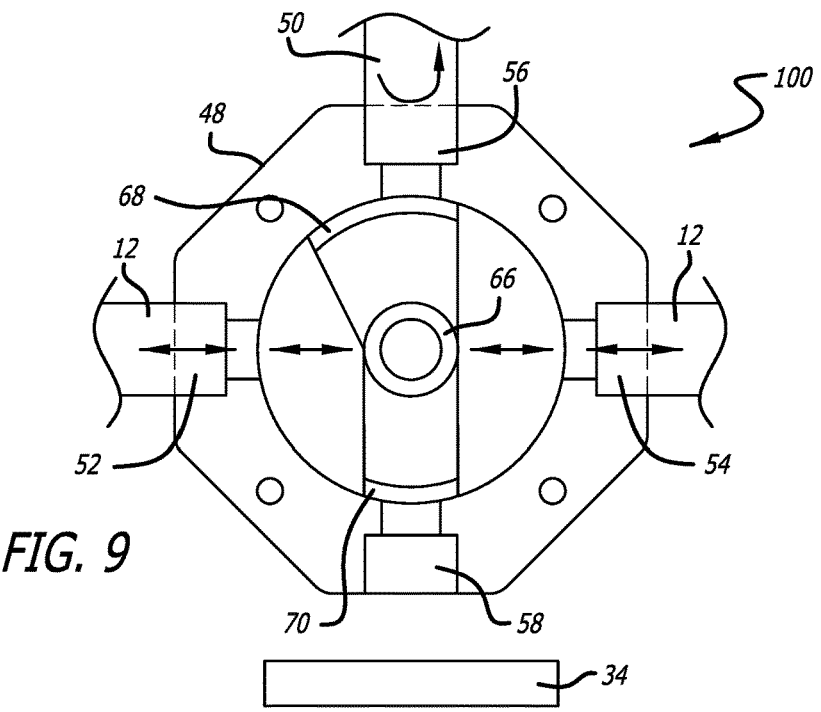
FIG. 9 is a schematic view of the water distribution valve operating in a filling mode.

More particularly, as illustrated in FIGS. 9-12, the water distribution valve 48 preferably operates according to four modes of operation, including a filling mode 100, a manifold draining mode 200, a system draining mode 300, and a filter draining mode 400. FIG. 9 depicts the valve operating in the filling mode. In this mode, the first end 68 of the rotary closure element 66 covers or closes the filter drain port 56, and the second end 70 of the rotary closure element covers or closes the discharge drain port 58. In this way, the water distribution valve prevents drainage of water through the filter drain port or the discharge drain port and allows water to flow only through the first supply manifold port 52 and the second supply manifold port 54, thereby allowing for potable water to fill the potable water distribution manifold 12 and supply water to the galley inserts 24 in the aircraft galley 16.

Figure 10:
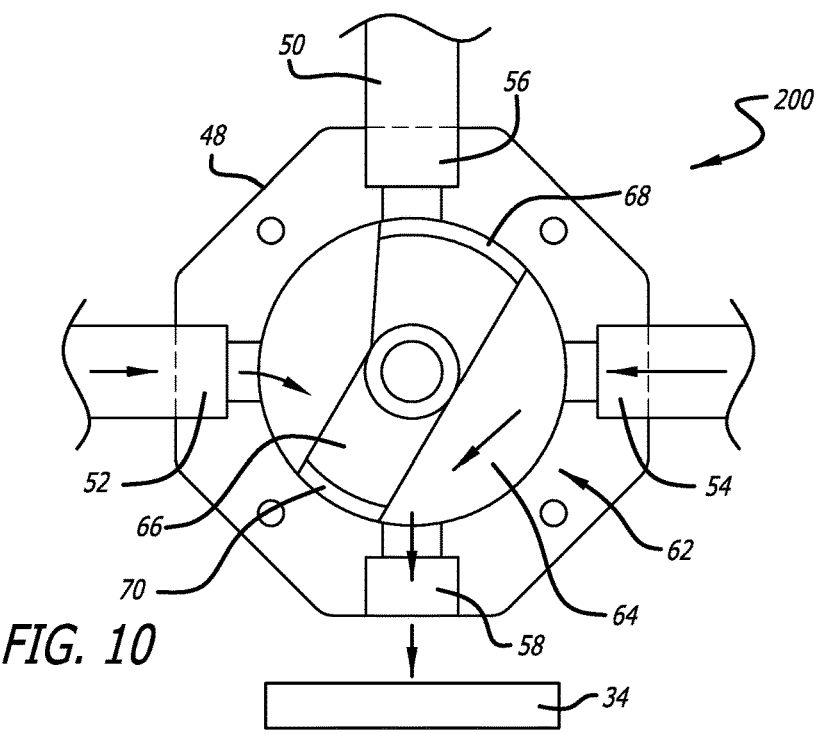
FIG. 10 is a schematic view of the water distribution valve operating in a manifold draining mode.

FIG. 10 depicts the water distribution valve 48 operating in the manifold draining mode 200. In this mode, the rotary closure element 66 is moved such that its second end 70 clears or opens the discharge drain port 58, thereby allowing for water flowing through the first supply manifold port 52 and the second supply manifold port 54 to drain down the discharge drain port. However, the first end 68 of the rotary closure element still covers or closes the filter drain port 56, thus continuing to prevent drainage of potable water through the filter drain port. In this way, this mode selectively allows only for drainage of the potable water distribution manifold 12, while preventing drainage of the water filter 28.

FIG. 11 depicts the water distribution valve 48 operating in the system draining mode 300. In this mode, the rotary closure element 66 is moved such that its first end 68 now clears or opens the filter drain port 56, and such that its second end 70 remains clear of any other port, thereby allowing water flowing through the filter drain port as well as water flowing through the first supply manifold port 52 and the second supply manifold port 54 to drain down the discharge drain port 58. In this way, the system draining mode selectively allows for drainage of the entire potable water supply and waste system 10, including the potable water distribution manifold 12 and the water filter 28.

Lastly, FIG. 12 depicts the water distribution valve 48 operating in the filter draining mode 400. In this mode, the rotary closure element 66 is moved such that its first end 68 now covers or closes the second supply manifold port 54 and such that its second end 70 now covers or closes the first supply manifold port 52, thereby preventing water from flowing through either of those ports. Here, filter drain port 56 and discharge drain port 58 remain clear or open, thus allowing for water flowing through the filter drain port to drain down the discharge drain port. In this way, the filter draining mode selectively allows only for drainage of the water filter 28, while preventing drainage of the potable water distribution manifold 12. This allows the exchangeable filter cartridge to be removed and replaced without draining the entire potable water supply system.

The FIGURES and aforementioned description specify particular orientations of the rotary closure element 66 during operation of the water distribution valve 48, with the first end 68 of the rotary closure element having a larger arcuate length than the second end 70. However, it should be noted that the positions of the first end and the second end may be reversed in the filling mode 100, the system draining mode 300, and the filter draining mode 400 so long as the intended result of the selected mode of operation remains. For example, in the filter draining mode, the rotary closure element may be rotated by 180 degrees such that the first end 68 covers the first supply manifold port 52 and the second end 70 covers the second supply manifold port 54, while still maintaining its intended result of operation of only allowing water flowing through the filter drain port 56 to drain from the potable water supply and waste system 10. Yet, in the manifold draining mode 200, the first end 68 of the rotary closure element should have a larger arcuate length than the second end 70 so that the water filter drain port 56 remains closed when the discharge drain port 58 is opened to drain, as illustrated in FIG. 10.

In a preferred embodiment of the present invention, an electrically operated stepper motor 76 (see FIG. 2B) is connected to the rotary closure element 66, for example, via actuating lever 72. In this way, the stepper motor may electromechanically move the rotary closure element according to the multiple modes of operation of water distribution valve 48. The stepper motor is preferably controlled by a processor (not shown), which is used to configure the stepper motor to position the rotary closure element for precise operation and function of the valve. Thus, the processor may configure the stepper motor, for instance as part of a start-up sequence, to switch the valve to filling mode 100 prior to beginning food and beverage service in a flight. Moreover, the processor may configure the stepper motor, for instance as part of a shut-down sequence, to switch the valve to its manifold draining mode 200, filter draining mode 400, or system draining mode 300 when completing food and beverage service for a flight. In the event the stepper motor or its power supply fails, the valve may be operated manually by use of conventional tools capable of moving the actuating lever and, in turn, the rotating closure element 66.

Figure 13:
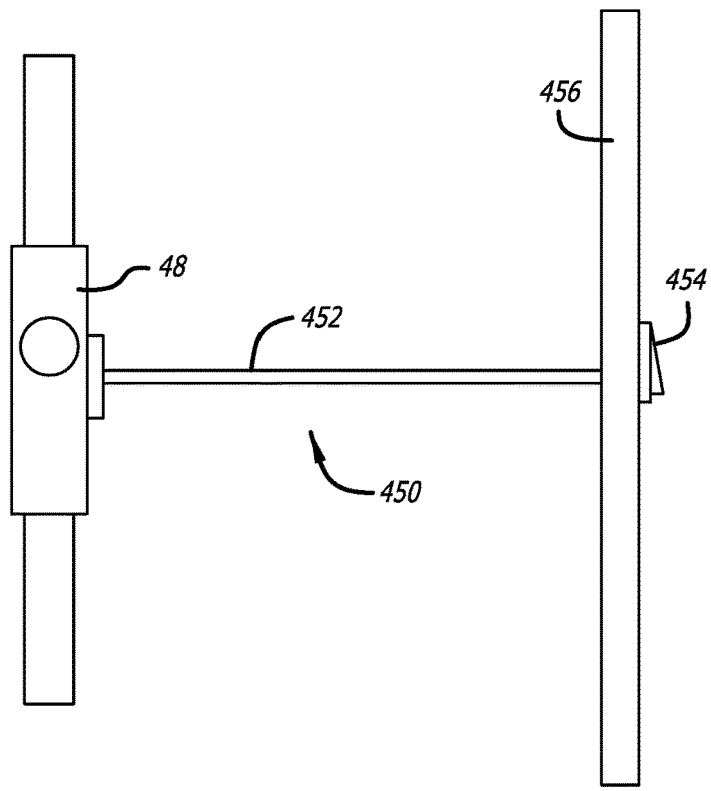
FIG. 13 is a schematic side view of a direct actuation manual system for controlling the water distribution valve.
Figure 14:
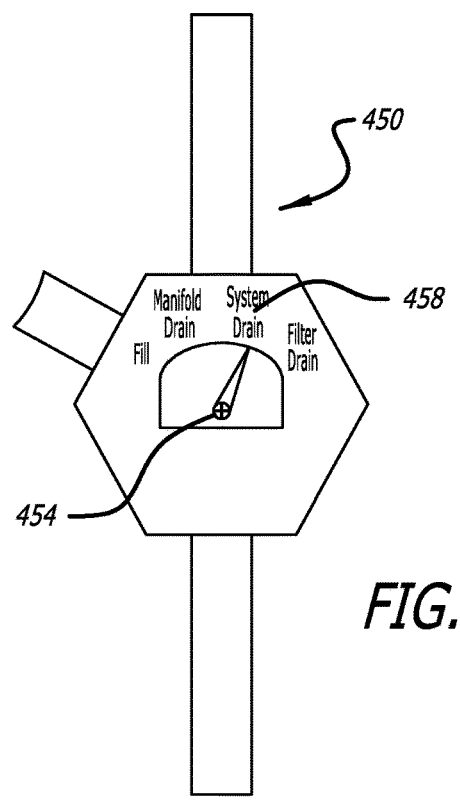
FIG. 14 is a schematic front view of the direct actuation manual system of FIG. 13 showing a visual indicator depicting the selected mode of operation of the water distribution valve.

It is also an option to combine electromechanical and direct manual operation of the water distribution valve 48, the manual operation being carried out via a shaft and actuating knob within easy reach of the cabin crew, and being used in the eventuality of electrical failure to the stepper motor 76. This removes the need for common tools in closing the valve manually in an emergency, and could also provide a visual indicator of the valve's position when the system 10 is in normal operation. In this regard, FIGS. 13 and 14 illustrate a direct actuation manual system 450 or direct acting manual selector in which an actuating shaft 452 is connected to the rotary closure element 66 to actuate the valve 48 between its plurality of modes of operation. An actuating knob 454 on a working face or panel 456 of the galley is connected to the actuating shaft to selectively move the valve between its filling mode 100, manifold draining mode 200, system draining mode 300, and filter draining mode 400. A visual indicator 458 on the galley panel shows the selected mode or position of the valve. In this way, in the event of electrical failure, a crew member may rotate the actuating knob to his or her position of choice as displayed on the visual indicator when filling or draining the system, manifold, and filter.

Figure 15:
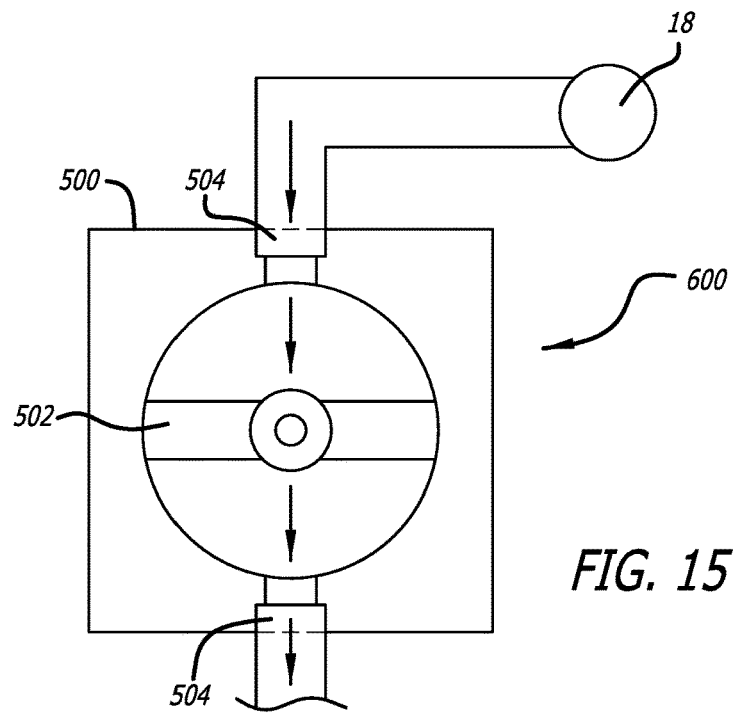
FIG. 15 is a schematic view of the main water shut off valve of FIG. 1 operating in an opened state.
Figure 16:
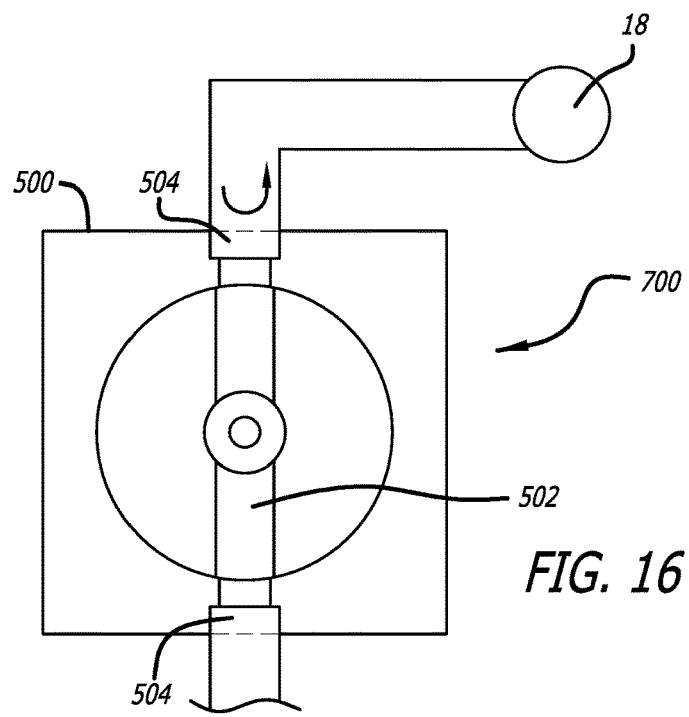
FIG. 16 is a schematic view of the main water shut off valve of FIG. 1 operating in a closed state.

Referring now to FIGS. 15 and 16, according to a preferred aspect, a main water shut off valve 500 is connected in fluid communication with the potable water source 18 for preventing the flow of potable water to the aircraft galley 16 if necessary. Although these Figures illustrate a possible embodiment of a main water shut off valve that operates using a hollow rotating member 502 similarly to the cruciform valve 48, any main water shut off valve known to one of ordinary skill in the art can be used. The main water shut off valve preferably operates between an opened state 600, as shown in FIG. 15, and a closed state 700 as shown in FIG. 16. In the opened state, the main water shut off valve allows the potable water from the potable water source to flow through valve ports 504 into the potable water distribution manifold 12 and supply potable water to the galley inserts 24. In the closed state, the main water shut off valve blocks the potable water from flowing through the valve ports into the potable water distribution manifold.

When the water distribution valve 48 is in any of its draining states to flush the potable water distribution manifold 12, the water filter 28, or the entire potable water supply and waste system 10, the main water shut off valve 500 cannot simultaneously be in its opened state 600. Otherwise, continuous discharge or draining of the aircraft's potable water supply would occur. Accordingly, the water distribution valve and the main water shut off valve are preferably interlinked and synchronized such that operation of the water distribution valve into its filling mode 100 simultaneously switches the main water shut off valve into its opened state, and operation of the water distribution valve into any of its draining modes 200, 300, and 400 simultaneously switches the main water shut off valve into its closed state 700. For example, the cruciform valve and main water shut off valve may be interlinked by a cable 800 (see FIG. 1) that is configured to rotate hollow rotating member 502 in response to movement of rotating member 66. Cable 800 is preferably a manual cable but may alternatively be an electrical cable if the cruciform valve and/or main water shut off valve are electrically operated. As a result, the cruciform valve is never in any of its draining states when the main water shut off valve is in the opened state, and continuous discharge of the potable water source 18 is thereby avoided. The synchronization of the cruciform valve and main water shut off valve allow the potable water supply and waste system to be flushed before commencing galley service.

Therefore, a flight crew member who desires to supply potable water to the potable water supply and waste system 10 before a flight may simultaneously switch the water distribution valve 48 into its supplying state 100 and the main water shut off valve 500 into its opened state 600 to allow the potable water source 18 to supply water to the potable water supply and waste system. Moreover, a crew member who desires to drain the unused potable water from the potable water supply and waste system after a flight may simultaneously switch the water distribution valve into its draining states 200, 300, or 400 and the main water shut off valve into its closed state 700 to allow the unused potable water to drain without draining the aircraft's potable water supply.

FIG. 17 illustrates an example of an aircraft galley 16 with work deck 14 inside which the potable water supply and waste system 10 may be installed. In a preferred embodiment, the potable water supply and waste system may be installed behind the wall 802 of the work deck above the galley cart bays 804. According to a presently preferred aspect, the potable water supply and waste system 10 is also fitted prior to installation and use on a service wall 806 (see e.g., FIG. 1). The service wall including the fitted potable water supply and waste system is then installed along with electrical systems and air systems as a complete assembly in the aircraft galley.

FIG. 18 illustrates a preferred embodiment of the potable water supply and waste system 10 after it is installed in the work deck 14 of the aircraft galley 16. The potable water supply and waste system 10 is positioned behind above work deck structure 900 over existing, chilled air return plenums 902 for beverage galley carts. The chilled air return plenums are located inside the galley cart bays 804 of FIG. 17. The compact drain strainer 38 is sized to fit below the work deck between the chilled air return plenums to filter the waste water and act as a backflow preventer, and the faucet 40 and sink 42 are accessible for crew member use. Moreover, the potable water distribution manifold 12 is connected in fluid communication with the potable water source 18 of the aircraft. The potable water distribution manifold and galley insert drain lines 32 are further connected to the galley inserts 24 in the work deck, such as the beverage makers 26 depicted in FIG. 17.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A water distribution valve for a potable water supply and waste system of an aircraft galley, the potable water supply and waste system including a potable water distribution manifold having one or more vent valves, a water filter connected to a water filter drain line, one or more galley insert drain lines, one or more sumps connected to a main drain line, and a compact drain strainer connected to the main drain line, the water distribution valve comprising:

a valve body;

a cruciform manifold inside the valve body, the cruciform manifold including a filter drain port configured to connect in fluid communication with a water filter in the potable water supply and waste system, a first supply manifold port and a second supply manifold port configured to connect in fluid communication with the potable water distribution manifold in the potable water supply and waste system, and a discharge drain port configured to drain potable water from the water filter and the potable water distribution manifold into a main drain line in the potable water supply and waste system; and a rotary closure element contained within the cruciform manifold, the rotary closure element having a first end and a second end, the first end and second end being arcuate and the first end having a larger arcuate length than the second end, the rotary closure element configured to move according to a plurality of modes of operation of the valve including:

a filling mode in which one of the first end and second end of the rotary closure element closes the filter drain port and the other of the first end and second end of the rotary closure element closes the discharge drain port, leaving the first supply manifold port and the second supply manifold port open to enable filling of the potable water supply and waste system with potable water through the valve body;

a manifold draining mode in which the first end of the rotary closure element closes the filter drain port and the second end of the rotary closure element clears the discharge drain port, leaving the discharge drain port, the first supply manifold port, and the second supply manifold port open to enable drainage of the potable water distribution manifold through the valve body into the main drain line;

a system draining mode in which the first end and second end of the rotary closure element clear the filter drain port, the discharge drain port, the first supply manifold port, and the second supply manifold port to enable drainage of the potable water distribution manifold and the water filter through the valve body into the main drain line; and a filter draining mode in which one of the first end and second end of the rotary closure element closes the first supply manifold port and the other of the first end and second end of the rotary closure element closes the second supply manifold port, leaving the filter drain port and the discharge drain port open to enable drainage of the water filter through the valve body into the main drain line.

2. The water distribution valve of claim 1, wherein the discharge drain port is configured to drain potable water from the water filter and the potable water distribution manifold into a sump connected to the main drain line in the potable water supply and waste system.

3. The water distribution valve of claim 1, further comprising a removable cover that encloses the rotary closure element within the valve body.

4. The water distribution valve of claim 1, further comprising an actuating lever connected to the rotary closure element for rotating the rotary closure element between the plurality of modes of operation of the valve.

5. The water distribution valve of claim 4, further comprising a stepper motor operatively connected to the actuating lever that is configured to move the rotary closure element between the plurality of modes of operation of the valve.

6. The water distribution valve of claim 1, wherein the valve is a material selected from the group consisting of plastic, metal, and a combination of plastic and metal.

7. The water distribution valve of claim 1, wherein the first supply manifold port and the second supply manifold port are inclined at an angle relative to a horizontal axis of the water distribution valve.

8. The water distribution valve of claim 1, wherein the water distribution valve is interlinked with a main water shut off valve in the potable water supply and waste system such that when the water distribution valve is in the filing mode, the main water shut off valve allows potable water to flow to the potable water distribution manifold, and when the water distribution valve is in the manifold draining mode, the system draining mode, or the filter draining mode, the main water shut off valve blocks potable water from flowing to the potable water distribution manifold, thereby preventing continuous drainage of potable water in the potable water supply and waste system.

9. A water distribution valve for a potable water supply and waste system of an aircraft galley, the potable water supply and waste system including a potable water distribution manifold having one or more vent valves, a water filter connected to a water filter drain line, one or more galley insert drain lines, one or more sumps connected to a main drain line, and a compact drain strainer connected to the main drain line, the water distribution valve comprising:

a valve body including one or more removable covers;
a cruciform manifold inside the valve body, the cruciform manifold including a filter drain port configured to connect in fluid communication with the water filter in the potable water supply and waste system, a first supply manifold port and a second supply manifold port configured to connect in fluid communication with the potable water distribution manifold in the potable water supply and waste system, and a discharge drain port configured to drain potable water from the water filter and the potable water distribution manifold into the sump connected to the main drain line in the potable water supply and waste system; and
a rotary closure element contained within the cruciform manifold, the rotary closure element having a first end and a second end, the first end and second end being arcuate and the first end having a larger arcuate length than the second end, the rotary closure element configured to move according to a plurality of modes of operation of the valve including:
a filling mode in which one of the first end and second end of the rotary closure element closes the filter drain port and the other of the first end and second end of the rotary closure element closes the discharge drain port, leaving the first supply manifold port and the second supply manifold port open to enable filling of the potable water supply and waste system with potable water through the valve body;
a manifold draining mode in which the first end of the rotary closure element closes the filter drain port and the second end of the rotary closure element clears the discharge drain port, leaving the discharge drain port, the first supply manifold port, and the second supply manifold port open to enable drainage of the potable water distribution manifold through the valve body into the main drain line;
a system draining mode in which the first end and second end of the rotary closure element clear the filter drain port, the discharge drain port, the first supply manifold port, and the second supply manifold port to enable drainage of the potable water distribution manifold and the water filter through the valve body into the main drain line; and
a filter draining mode in which one of the first end and second end of the rotary closure element closes the first supply manifold port and the other of the first end and second end of the rotary closure element closes the second supply manifold port, leaving the filter drain port and the discharge drain port open to enable drainage of the water filter through the valve body into the main drain line.

10. The water distribution valve of claim 9, further comprising an actuating lever connected to the rotary closure element for rotating the rotary closure element between the plurality of modes of operation of the valve.

11. The water distribution valve of claim 10, further comprising a stepper motor operatively connected to the actuating lever that is configured to move the rotary closure element between the plurality of modes of operation of the valve.

12. The water distribution valve of claim 9, wherein the valve is a material selected from the group consisting of plastic, metal, and a combination of plastic and metal.

13. The water distribution valve of claim 9, wherein the first supply manifold port and the second supply manifold port are inclined at an angle relative to a horizontal axis of the water distribution valve.

14. The water distribution valve of claim 9, wherein the water distribution valve is interlinked with a main water shut off valve in the potable water supply and waste system such that when the water distribution valve is in the filing mode, the main water shut off valve allows potable water to flow to the potable water distribution manifold, and when the water distribution valve is in the manifold draining mode, the system draining mode, or the filter draining mode, the main water shut off valve blocks potable water from flowing to the potable water distribution manifold, thereby preventing continuous drainage of potable water in the potable water supply and waste system.

15. A water distribution valve for a potable water supply and waste system of an aircraft galley, the potable water supply and waste system including a potable water distribution manifold having one or more vent valves, a water filter connected to a water filter drain line, one or more galley insert drain lines, one or more sumps connected to a main drain line, and a compact drain strainer connected to the main drain line, the water distribution valve comprising:
a valve body including one or more removable covers;
a cruciform manifold inside the valve body, the cruciform manifold including a filter drain port configured to connect in fluid communication with the water filter in the potable water supply and waste system, a first supply manifold port and a second supply manifold port configured to connect in fluid communication with the potable water distribution manifold in the potable water supply and waste system, and a discharge drain port configured to drain potable water from the water filter and the potable water distribution manifold into the sump connected to the main drain line in the potable water supply and waste system;
a rotary closure element contained within the cruciform manifold, the rotary closure element having a first end and a second end, the first end and second end being arcuate and the first end having a larger arcuate length than the second end, the rotary closure element configured to move according to a plurality of modes of operation of the valve; and
an actuating lever connected to the rotary closure element for rotating the rotary closure element between the plurality of modes of operation of the valve, the plurality of modes of operation of the valve including:
a filling mode in which one of the first end and second end of the rotary closure element closes the filter drain port and the other of the first end and second end of the rotary closure element closes the discharge drain port, leaving the first supply manifold port and the second supply manifold port open to enable filling of the potable water supply and waste system with potable water through the valve body;
a manifold draining mode in which the first end of the rotary closure element closes the filter drain port and the second end of the rotary closure element clears the discharge drain port, leaving the discharge drain port, the first supply manifold port, and the second supply manifold port open to enable drainage of the potable water distribution manifold through the valve body into the main drain line;
a system draining mode in which the first end and second end of the rotary closure element clear the filter drain port, the discharge drain port, the first supply manifold port, and the second supply manifold port to enable drainage of the potable water distribution manifold and the water filter through the valve body into the main drain line; and a filter draining mode in which one of the first end and second end of the rotary closure element closes the first supply manifold port and the other of the first end and second end of the rotary closure element closes the second supply manifold port, leaving the filter drain port and the discharge drain port open to enable drainage of the water filter through the valve body into the main drain line.

16. The water distribution valve of claim 15, wherein the valve is a material selected from the group consisting of plastic, metal, and a combination of plastic and metal.

17. The water distribution valve of claim 15, wherein the first supply manifold port and the second supply manifold port are inclined at an angle relative to a horizontal axis of the water distribution valve.

18. The water distribution valve of claim 17, wherein the angle is 5 degrees.

19. The water distribution valve of claim 15, wherein the water distribution valve is interlinked with a main water shut off valve in the potable water supply and waste system such that when the water distribution valve is in the filing mode, the main water shut off valve allows potable water to flow to the potable water distribution manifold, and when the water distribution valve is in the manifold draining mode, the system draining mode, or the filter draining mode, the main water shut off valve blocks potable water from flowing to the potable water distribution manifold, thereby preventing continuous drainage of potable water in the potable water supply and waste system.

20. The water distribution valve of claim 15, further comprising a stepper motor operatively connected to the valve that is configured to move the rotary closure element between the plurality of modes of operation of the valve.

21. The water distribution valve of claim 1, further comprising a duality of actuating systems wherein a direct actuation manual system is used to operate the water distribution valve, in the event of electromechanical failure, without the use of tools.

22. The water distribution valve of claim 1, wherein an actuating knob of a direct acting manual selector is used as a visual indicator of the position of the water distribution valve.

* * * * *